United States Patent [19]

Charron

[11] Patent Number: 4,747,197
[45] Date of Patent: May 31, 1988

[54] MACHINE FOR APPLYING T-MOLDING

[76] Inventor: Eli A. Charron, 103 Sycamore St., Swansea, Mass. 02777

[21] Appl. No.: 31,361

[22] Filed: Mar. 30, 1987

[51] Int. Cl.⁴ .......................................... H01B 13/22
[52] U.S. Cl. ................................................... 29/235
[58] Field of Search ............... 29/235, 252, 254, 451, 29/525; 173/90; 72/76

[56] References Cited

U.S. PATENT DOCUMENTS 2,995,053  8/1961  Freedom .............................. 29/254
3,798,739  3/1974  Fritz .................................... 29/235
4,471,526  9/1984  Zaltsberg ............................ 29/235

Primary Examiner—Robert C. Watson
Attorney, Agent, or Firm—Robert J. Doherty

[57] ABSTRACT

A hand-supported and hand-controlled machine for applying a T-molding strip to the edge of a surface such as a table or desk top. The machine includes a contact actuated air hammer and a pair of spaced handles to insure secure gripping while the projecting face of the hammer is progressively moved around the periphery of the supported surface.

10 Claims, 2 Drawing Sheets

MACHINE FOR APPLYING T-MOLDING

BACKGROUND AND OBJECTS OF THE INVENTION

This invention relates to a machine and method of applying T-molding to the edge of a surface such as a table top and the like. The T-molding is normally applied to the edge of such surfaces to give a finished look and to protect the edges from bumps, scrapes, and the like. The T-molding is supplied in strip form and has a rectangular or somewhat crescent-shape body and a barb inwardly projecting therefrom. The barb is adapted to fit into a slot cut into the outer peripheral surface of the table top and in this way provides for the frictional engagement which in turn enables the T-molding to be attached to the edge of the table top. Various types of T-molding are known and are generally extruded from known plastic material such as medium density polyethylene and the like. In some constructions, the inwardly extending barb is serrated to provide for greater frictional contact with the inwardly extending slot in the peripheral face of the table top edge which is usually accomplished by routing. Naturally, object surfaces other than table tops may be so provided with T-molding strips.

Generally, such T-molding is applied to the edges of such surfaces by a hand held pneumatic impact hammer such as that made by Danair Inc. and described in the Outwater Plastics, Inc. catalog portion attached. Such hand held hammers require a good deal of experience to accomplish satisfactory results, and the operator easily tires from the repeated recoil of such a device. The above assembly technique is primarily suited for low volume applications whereas in high volume applications, it is known to use an Evans Rotork Machine available from Evans Rotork, Inc. Such machine is stationary and provides an impact head over which a strip of T-molding moves, while a pair of operators grasp the object such as the table or desk top and progressively position it in front of the impact hammer so as to progressively enable the T-molding to be forced into the peripheral slot provided therein.

While the hand method is suitable notwithstanding the above-mentioned drawbacks for small repair or retrofit situations, the Evans' machine generally requires a pair of operators and, of course, involves a high capital expenditure. Accordingly, there is a need for an intermediate device which would enable one operator to apply T-molding to a positioned table top in a rapid, trouble-free manner which does not necessitate the high cost of the sophisticated Evans machinery. These and other objects of the present invention are accomplished by a hand-guided machine for applying a strip of T-molding to the edge of a planar object surface having a peripheral edge with a slot for receiving said T-molding such as a table top wherein said T-molding has an inward barb adapted to extend into said slot and a closed end which first engages said slot and a free or trailing end, said machine comprising a frame including a housing at the rear end thereof, said housing in turn supporting a contact actuated vibratory hammer having an impact member outwardly extending from the forward end of said housing and having a face for contacting said object surface peripheral edge, at least one support shelf forwardly extending from said housing so as to overlie said object surface and provided with a contact member for contacting said object, feed means for a strip of said T-molding supported adjacent said housing for positioning said strip between said peripheral edge surface and said contact member, separate handles outwardly projecting from said machine in spaced relation from each other such that an operator may firmly operatively grasp said machine.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is an elevational view of the machine of the present invention shown supported in operable position upon a large planar object surface such as a table top or the like;

DETAILED DESCRIPTION OF THE INVENTION

Figure 4:
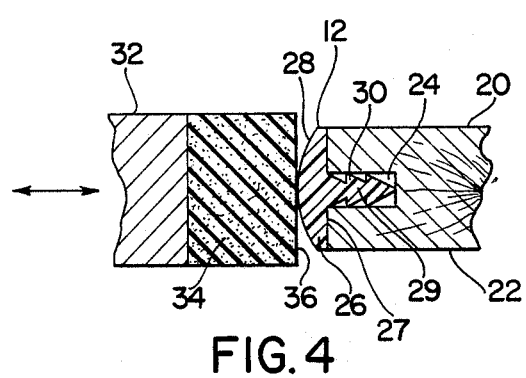
FIG. 4 is a cross-sectional view on an enlarged scale along line 4—4 of FIG. 3.
Figure 3:
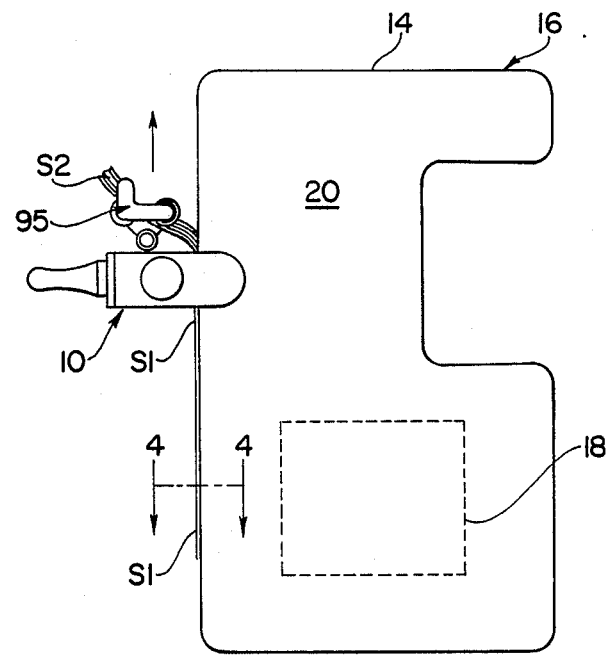
FIG. 3 is a top plan schematic view on a smaller scale showing the manner in which the machine of the present invention is utilized.

Turning now to the drawings and particularly FIGS. 3 and 4, the machine 10 of the present invention has particular utility in applying a T-molding 12 to the peripheral surface 14 of a table top or similar object surface 16. Such table top or other generally planar surface having a peripheral edge 14 is preferably generally somewhat centrally supported by a vacuum table 18 shown in dotted lines in FIG. 3 such that large peripheral portions of the table top overhang the vacuum table 18. It should be pointed out that other mechanisms to hold the table top 16 in a stable position other than a vacuum table may be utilized.

The table top 16 includes an upper surface 20 and a lower surface 22. The table top is generally of planar configuration and exhibits a peripheral edge surface 14 in which a slot 24 is provided. Such slot may be formed in the edge 14 by router, cutter, or other conventional tools. The T-molding 12 as best shown in FIG. 4 includes a body 26 which is somewhat button-shape in cross-sectional configuration and includes an inner surface 27 and an outer surface 28. The body 26 further exhibits an inwardly extending T portion or barb 29 which may or may not be provided with actual barbs 30. In any event, the thickness of the T portion 29 which inwardly extends from the inner surface 27 of the body 26 is extensive enough so as to form a frictional engagement with the wall's slot 24 and thus insure that the T-molding is held to the peripheral portion of the table top 16 in the intended manner.

In order to provide the action by which the T-molding is forced into such aforementioned relationship, an impact hammer 32 having an impact member 34 with a face 36 is positioned such that contact of the face 36 with the outside surface 28 of the body 26 causes the impact hammer to actuate and repeatedly strike and thus force the T-molding into the slot as the machine 10 progresses along the periphery of the table top 16 in the direction of the arrow shown in FIG. 3.

Figure 1:
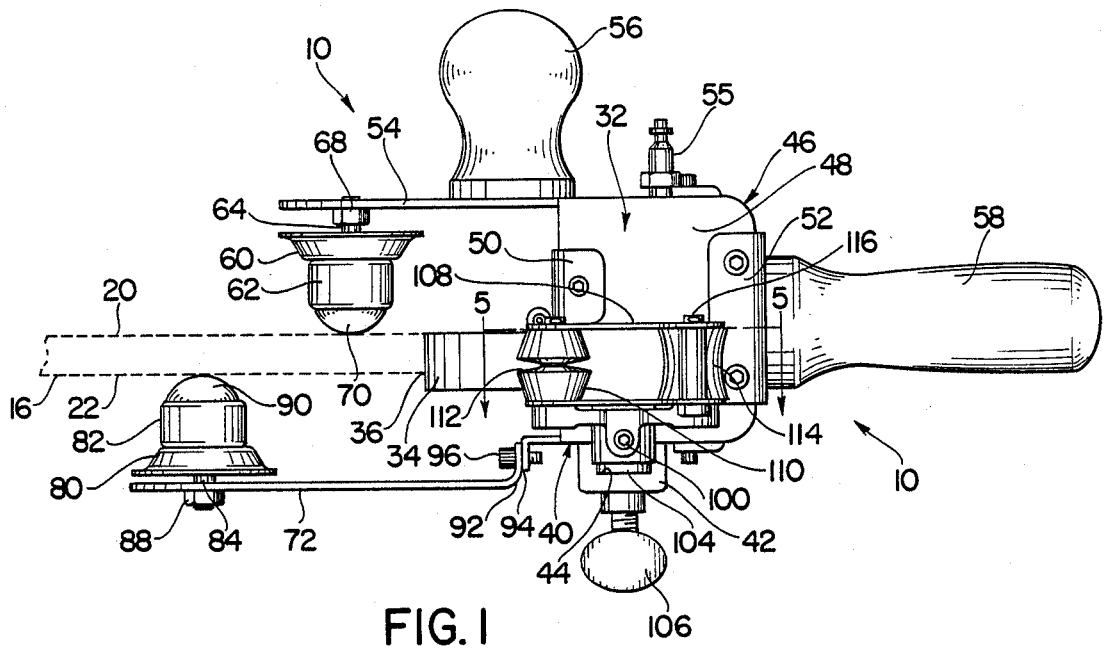
Figure 2:
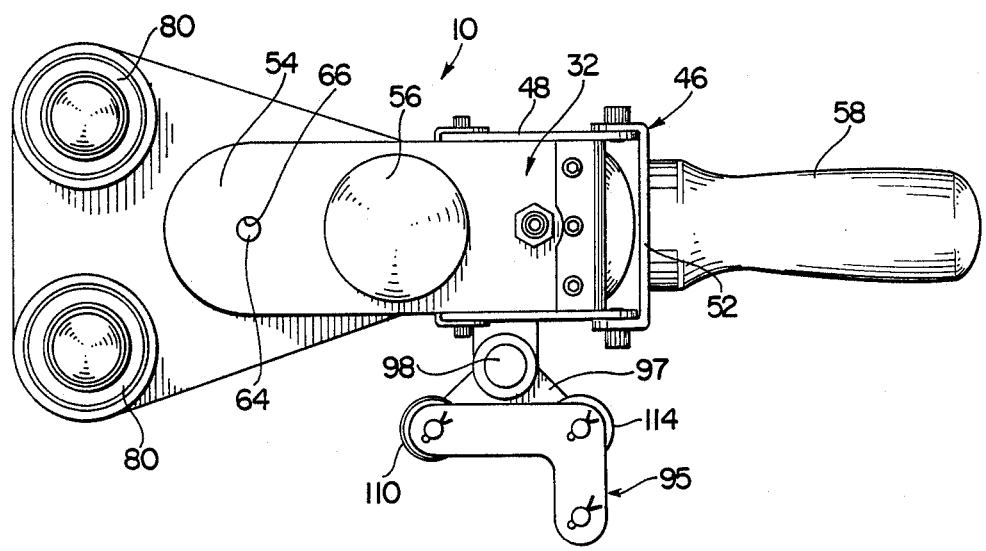
FIG. 2 is a top view thereof with the table top removed for clarity.
Figure 5:
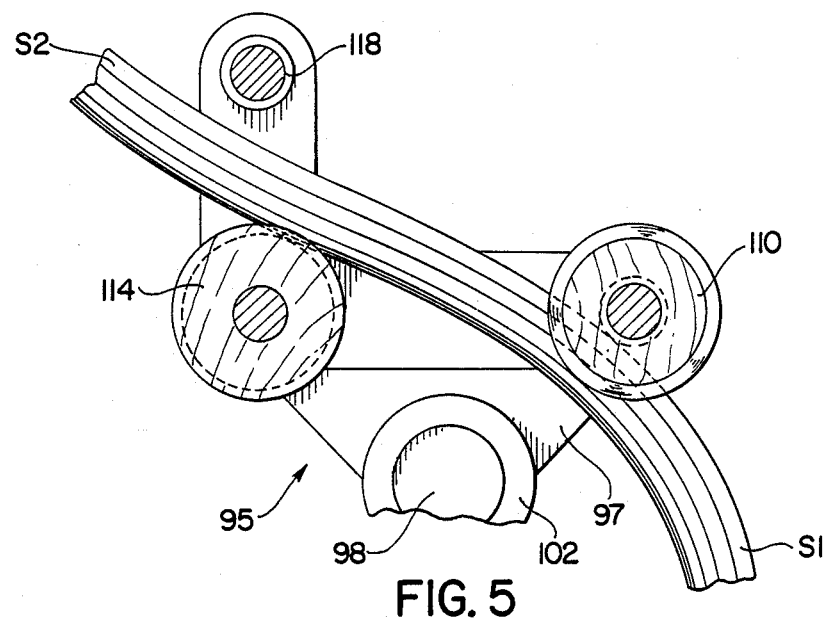
FIG. 5 is an enlarged partial plan view of a portion of FIG. 1 as shown by the arrow 5 in FIG. 1.

Referring now to FIGS. 1 through 3 of the drawings in particular, the preferred construction of the machine 10 will now be explained. The machine 10 includes a frame 40 including a downwardly extending U-shape portion 42 which defines a lateral slot 44, the purposes of which will hereinafter be more fully explained. The frame 40 further includes a housing 46 including side plates 48 as well as front and rear plates 50, 52 respectively.

An air impact hammer 32 is fixedly mounted within the housing 46 and positioned such that the impact member 34 thereof and the face 36 extends outwardly and forwardly of the housing 46. The general configuration of the impact member is that of a laterally extending shelf of generally semi-circular or at least rounded configuration when viewed from the top or bottom thereof such that a curved impact face 36 is presented to the outer surface 28 of the T-molding body 26. The thickness of such impact member 34 is generally equal to or slightly greater than the normal thickness of the table top 16 but a wide variety of thicknesses of both table tops and impact members may be utilized in conjunction with each other. Generally, the impact member 34 is formed is formed from a yieldable but hard rubber or similar material.

The upper portion of the housing 46 includes a forwardly extending shelf 54 which serves to enclose the upper portion of the housing and in turn is provided with an air inlet 55 operatively connected to the hammer 32. The shelf 54 is provided at its upper surface with a first handle 56 which upwardly extends therefrom and by which one hand of the operator may grasp the machine 10. Inwardly extending from the rear wall 52 of the housing 46 is a second handle 58. The size, shape, and specific manner in which the handles 56, 58 outwardly extend from the machine 10 may vary; however, it is important that the handles be separate and spaced from each other such that the operator can have a firm grasp of the overall machine by engaging such handles in both hands, and it is preferable that one of the handles extend to the rear of the machine as illustrated and that the other handle extend upwardly also as illustrated.

The shelf 54 is provided with a first contact member 60 downwardly extending therefrom and including a body 62 which is adjustably attached to the shelf 54 by means of an upwardly extending rod 64 which extends into a threaded hole 66 through the shelf 54. A threaded nut 68 is positioned between the body 62 and the lower portion of the shelf 54 such that it acts as a stop nut and provides for adjustment of the first contact member 60 towards and away from the upper surface 20 of the table top 16. The bottom of the body 62 is provided with a free-rolling roller element 70 which serves to contact the upper surface 20.

The machine is further provided with a second or lower shelf 72 which forwardly extends from the frame 40. The second shelf is provided with a pair of upwardly extending second contact members 80 each similarly provided with a body 82, a downwardly extending threaded rod 84 operatively connected with threaded holes (not shown) through the shelf 72 and stop nuts 88 such that the second contact members are adjustably movable towards and away from the lower surface 22 of the table top 16. It should be pointed out that the two lower contact members 80 are laterally spaced from each other and preferably disposed outwardly offset with regard to the first contact member 60 such that a staggered three-point contact is achieved such that a greater part of the machine 10 is supported via the contact members by the table top 16. The operator primarily merely guides the machine along the periphery of the table top as shown in FIG. 3. Of course, the operator must control the overall position of the machine so that the impact member 34 touches the outside surface of the T-molding and firmly grasps the machine so as to prevent the recoil of the hammer 32 from interfering with the intended motion.

It should be pointed out that in some cases it is desirable that the machine be used without the lower shelf 72 as when retrofit work is required on a table top or other surface which has already been mounted on a desk or other supporting element which does not provide for an overhand whereby the lower shelf can be utilized. In such cases, the inner edge of the lower shelf 72 is provided with an upwardly extending terminal wall 92 which abuts with a downwardly extending ledge 94 provided on the frame 40. Openings (not shown) through both the wall 92 and the ledge 94 are aligned such that bolts 96 may be used to releasably fasten the second or lower shelf 72 in the intended position or to remove the same.

The feed means for the T-molding strip is best shown by simultaneous reference to FIGS. 1 through 3 and 5 wherein it may be seen that such feed assembly 95 includes a platform 97 of generally planar configuration and preferably disposed in a lateral plane is pivotally mounted on an upstanding pin 98 such that the platform may be swiveled between various fixed positions. A set screw 100 extending through a cylindrical barrel 102 which fits over the pin 98 serves to position the feed assembly 95 with respect to the housing 46. The upstanding pin 98 is in turn connected to a bar 104 which is positioned in the slot 44 and held thereby with a thumb screw 106. In this way then, the thumb screw may simply be loosened and the bar 104 slipped out of the slot 44 and reversed such that the feed means may be placed in a position adjacent the housing 46 but on the opposite side thereof. It may be seen by reference to FIG. 3 that the feed assembly 95 is positioned on the downstream side of the machine 10 such that the first or attached end of the T-molding strip S1 is positioned upstream, whereas the free or non-attached end S2 is positioned down-stream.

The shelf 97 includes a pair of parallel plates 108 between which a first generally barrel-shaped strip contacting forward roller 110 having a circumferential inwardly extending slot 112 is positioned forwardly and a second generally concaveshaped roller 114 positioned rearwardly between the plates. It should be pointed out that both the rollers 110 and 114 are free to rotate on pin assemblies 116 extending between the plates 108. A second rear roller 118 may be positioned adjacent the roller 114 such that the strip 12 is fed therebetween and thence into contact with the forward roller 110 at a position between such roller and the housing 46 such that the T portion or barb 29 extends into the slot 24 and the strip is presented in a bent position just prior to its contact with the impact surface 34. This insures that the T-portion or barb 29 is fully exposed and rigid when entering the slot 24. Thus, it is desirable to position the forward roller 110 in a variety of positions each proximal to the forward extent of the impact surface 34 as well as the housing 46.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A hand-guided machine for applying a strip of T-molding to the edge of a planar object having opposed top and bottom surfaces and having a peripheral edge with a slot for receiving said T-molding such as a table top wherein said T-molding has an inward barb adapted to extend into said slot and a first strip end which first engages said slot and a free or trailing strip end, said machine comprising a frame including a housing at the rear end thereof, said housing in turn supporting a contact actuated vibratory hammer having an impact member outwardly extending from the forward end of said housing and having a face for contacting said T-molding first strip and which projects into said object surface peripheral edge, at least one support shelf forwardly extending from said housing so as to overlie said object surface and provided with a contact member for contacting said object, feed means for said strip of said T-molding supported adjacent said housing for positioning said strip between said peripheral edge surface and said contact member, separate handles outwardly projecting from said machine in spaced relation from each other such that an operator may firmly operatively grasp said machine, there being upper and lower opposed support shelves forwardly extending from said housing and each such shelf provided with an object surface contacting member, the contacting members of said opposed shelves extending towards each other but spaced from each other a distance approximating that of said object thickness such that said contacting members essentially support the machine on said object top surface.

2. The machine of claim 1, said contacting members adjustable towards and away from a lateral plane normally outwardly extending from said impact member and terminating in free rolling member.

3. A hand-guided machine for applying a strip of T-molding to the edge of a planar object having opposed top and bottom surfaces and having a peripheral edge with a slot for receiving said T-molding such as a table top wherein said T-molding has an inward barb adapted to extend into said slot and a first strip end which first engages said slot and a free or trailing strip end, said machine comprising a frame including a housing at the rear end thereof, said housing in turn supporting a contact actuated vibratory hammer having an impact member outwardly extending from the forward end of said housing and having a face for contacting said T-molding first strip and which projects into said object surface peripheral edge, at least one support shelf forwardly extending from said housing so as to overlie said object surface and provided with a contact member for contacting said object, feed means for said strip of said T-molding supported adjacent said housing for positioning said strip between said peripheral edge surface and said contact member, separate handles outwardly projecting from said machine in spaced relation from each other such that an operator may firmly operatively grasp said machine, said feed means including first and second rollers between which said T-molding strip passes, said first roller positioned proximal to but slightly rearward of said impact member face and having a circumferential slot formed therein for receipt of the barb portion of said T-molding.

4. The machine of claim 3, said feed means pivotally mounted on said frame for movement between fixed positions towards and away from said impact member face such that said strip is bent proximal to its contact with said edge slot as said machine is moved towards the trailing end of said strip.

5. The machine of claim 4, said feed means reversible to opposite sides of said housing.

6. The machine of claim 1, said housing including an air inlet for pneumatically driving said hammer.

7. The machine of claim 6, said hammer impact member face of a hard yet yieldable substance such as rubber.

8. The machine of claim 7, said impact member face of a generally semi-circular cross sectional configuration.

9. The machine of claim 1, said impact member face of a generally semi-circular cross-sectional configuration and forwardly extending into a lateral plane defined by the space between said shelves.

10. The machine of claim 1, one said handle positioned on said upper shelf and upwardly extended therefrom, the other said handle inwardly extending from the rear of said housing.

* * * * *